(12) United States Patent
Richard et al.

(10) Patent No.: US 9,521,379 B2
(45) Date of Patent: Dec. 13, 2016

(54) METHOD FOR THE ADJUSTMENT OF A COLOUR FILTER FOR A DITIGIAL SENSOR AND THE ASSOCIATED FILTER

(71) Applicant: Swiss Timing Ltd, Corgemont (CH)

(72) Inventors: Pascal Richard, Corgemont (CH); Fabien Blondeau, Chezard-St-Martin (CH); Jens Hermann Mueller, Leipzig (DE); Oliver Gress, Leipzig (CH)

(73) Assignee: Swiss Timing Ltd, Corgemont (CH)

( * ) Notice: Subject to any disclaimer, the term of this patent is extended or adjusted under 35 U.S.C. 154(b) by 0 days.

(21) Appl. No.: 14/558,910

(22) Filed: Dec. 3, 2014

(65) Prior Publication Data
US 2015/0181178 A1    Jun. 25, 2015

(30) Foreign Application Priority Data
Dec. 20, 2013    (EP) .................................. 13199041

(51) Int. Cl.
*H04N 9/04*    (2006.01)
*G02B 5/20*    (2006.01)
*H04N 5/369*    (2011.01)

(52) U.S. Cl.
CPC .............. *H04N 9/045* (2013.01); *G02B 5/201* (2013.01); *H04N 5/3692* (2013.01)

(58) Field of Classification Search
CPC ........ H04N 9/045; H04N 5/3692; G02B 5/201
See application file for complete search history.

(56) References Cited

U.S. PATENT DOCUMENTS

| 5,278,657 A | 1/1994 | Tamura |
| 6,411,329 B1 | 6/2002 | Richard et al. |
| 2007/0024931 A1 | 2/2007 | Compton et al. |
| 2007/0076269 A1* | 4/2007 | Kido ................... H04N 5/23245 358/474 |
| 2008/0068475 A1* | 3/2008 | Choe ...................... H04N 9/045 348/273 |
| 2012/0176521 A1 | 7/2012 | Compton et al. |

FOREIGN PATENT DOCUMENTS

| EP | 0 516 449 A1 | 12/1992 |
| EP | 0 898 249 A1 | 2/1999 |
| JP | 64-77288 | 3/1989 |

OTHER PUBLICATIONS

European Search Report issued Apr. 14, 2014 in European Application 13199041, filed on Dec. 20, 2013 (with English Translation).
"Manual MacFinish 2D 100", XP55113153, http://www.timetronics.be/Manuals/2012, 2012, 83 pages.

* cited by examiner

*Primary Examiner* — Gevell Selby
(74) *Attorney, Agent, or Firm* — Oblon, McClelland, Maier & Neustadt, L.L.P.

(57) ABSTRACT

Method for the adjustment of a photo finish camera including a matrix color filter, characterized in that the method includes the following steps:
- a first step of selecting a basic pattern having optical properties of sensitivity, of color quality and of resolution which are predefined according to race parameters;
- a second step of software selection of a set of adjacent columns whose number corresponds to the width of said selected basic pattern;
- a third step of centering said set of adjacent columns on the finish line.

13 Claims, 2 Drawing Sheets

METHOD FOR THE ADJUSTMENT OF A COLOUR FILTER FOR A DITIGIAL SENSOR AND THE ASSOCIATED FILTER

This application claims priority from European Patent Application No. 13199041.8 filed on 20 Dec. 2013, the entire disclosure of which is hereby incorporated herein by reference.

FIELD OF THE INVENTION

The present invention concerns an adaptive colour filter including columns of coloured pixels and columns of white pixels for a digital array sensor, and a method of parameterization for such a filter for use in a photo finish camera.

STATE OF THE ART

Photosensitive sensors, formed of a mosaic of pixels, have long been known in the field of digital photography; the sensors most widely used for digital cameras use, for example, CCD (charge-coupled device) or CMOS (complementary metal oxide semiconductor) technology. In order to produce colour images, colour filters are applied to these digital sensors; the filters also take the form of an array of different colours, each colour being dedicated to a pixel of the sensor on which it is superposed. The colour that must be associated with each pixel of the resulting image is then obtained through image processing algorithms.

One of the most widely known colour filters is the Bayer filter, which is the most conventional form of RGB filter (R for Red, G for Green, and B for Blue, these three colours being the base colours from which any other colour can be obtained through a combination of additive synthesis). Such a filter uses a basic pattern covering 4 pixels, and which is repeated over the entire surface of the sensor, with two green pixels in opposite corners completed by a blue pixel and a red pixel.

A drawback of this type of colour filter is the considerable reduction in sensitivity of the associated digital sensor due to the significant attenuation of light which reaches the sensor. Indeed, a good part of the wave lengths are absorbed by the different filters. For these reasons, different variants of the Bayer filter have since been proposed, replacing, in particular, one of the two green pixels with a white pixel in order to improve the sensitivity of the sensor. The modified basic pattern is in this case also repeated over the whole filter.

In the field of sports competitions, auxiliary timing devices based on image recognition, more commonly referred to as "photo finish" devices are also known. Such systems allow an operator to distinguish between competitors crossing the finish line by viewing successive images taken by a high definition camera centred precisely on the finish line. By analysing the sequence of images, taken at successive given moments and consequently corresponding to different measured times, it is possible to determine after the event, but still very rapidly after the finish, the exact times at which each competitor crossed the line, for example to a thousandth of a second and thereby rank the competitors in a reliable manner.

The cameras used by these photo finish devices often include Linescan type CCD sensors (more commonly known by the acronym LS-CCD) whose image capture rate is even higher than that of standard CCD cameras, thereby allowing for a temporal resolution of up to a ten-thousandth of a second. The first sensors used for such cameras had a very specific array structure in the form of a bar, that is to say a single column of pixels aligned very precisely on the finish line. Nowadays, standard two-dimensional array sensors are more likely to be used, with the selection of the column aligned on the finish line being performed by software.

For such photo finish cameras equipped with LS-CCD sensors, RGB filters as described above may of course be used to obtain colour images. Nevertheless, these filters are not suited to provide sufficient quality in all race conditions. Indeed, depending for example on the time of the competition or the weather conditions, the ambient luminosity may vary significantly and thereby strongly impair the quality of the images obtained. The same applies for considerations regarding the type of race, which influence the speed of the competitors according to the events and therefore the parameters of the shot, including the exposure time.

There exists therefore a need for a photo finish camera fitted with colour filters for digital sensors without the known limitations.

BRIEF SUMMARY OF THE INVENTION

It is an object of the present invention to provide a new type of colour filter which has adaptive optical properties, and a new, particularly practical method of adjusting a photo finish camera using such a filter.

These objects are accomplished by a colour filter for a digital sensor formed of a two-dimensional pixel array, each pixel corresponding to a given colour, the pixel array being formed by alternating first columns of coloured pixels and second columns of white pixels, characterized in that each first column of coloured pixels includes a basic sequence of pixels repeated over the entire first column of coloured pixels, the basic sequence of pixels including at least three pixels of three different colours.

These objects are also achieved as a result of a method of adjusting a photo finish camera including such a colour filter, characterized in that it includes the following steps:

a first step of selecting a basic pattern having optical properties of sensitivity, of colour quality and of resolution, which are predefined according to race parameters;

a second step of software selection of a set of adjacent columns whose number corresponds to the width of said selected basic pattern;

a third step of centering said set of adjacent columns on the finish line.

Specific embodiments of the invention are defined in the dependent claims.

An advantage of this invention is that it makes it possible to permanently optimise the optical properties of the colour photos obtained using the proposed filter, regardless of the conditions of use.

A further advantage of the proposed solution is that it allows for fast and efficient adjustment of the optical parameters chosen for the shot, and in particular, according to a preferred embodiment according to which all the adjustments are made by software, without requiring any movement of the photo finish camera in any of its degrees of freedom. Thus, fine adjustments for aligning the photo finish camera in relation to the finish line may be made once and for all, with the filter adjustments being obtained uniquely by software processing. Permanently locking all degrees of freedom and the absence of any physical handling of the photo finish camera considerably simplifies the adjustment operations whilst allowing for adaptation to the maximum possible types of race conditions.

BRIEF DESCRIPTION OF THE DRAWINGS

Advantageous example implementations of the invention are given in the description and illustrated in the annexed Figures, in which.

EXAMPLE EMBODIMENT(S) OF THE INVENTION

Figure 1:
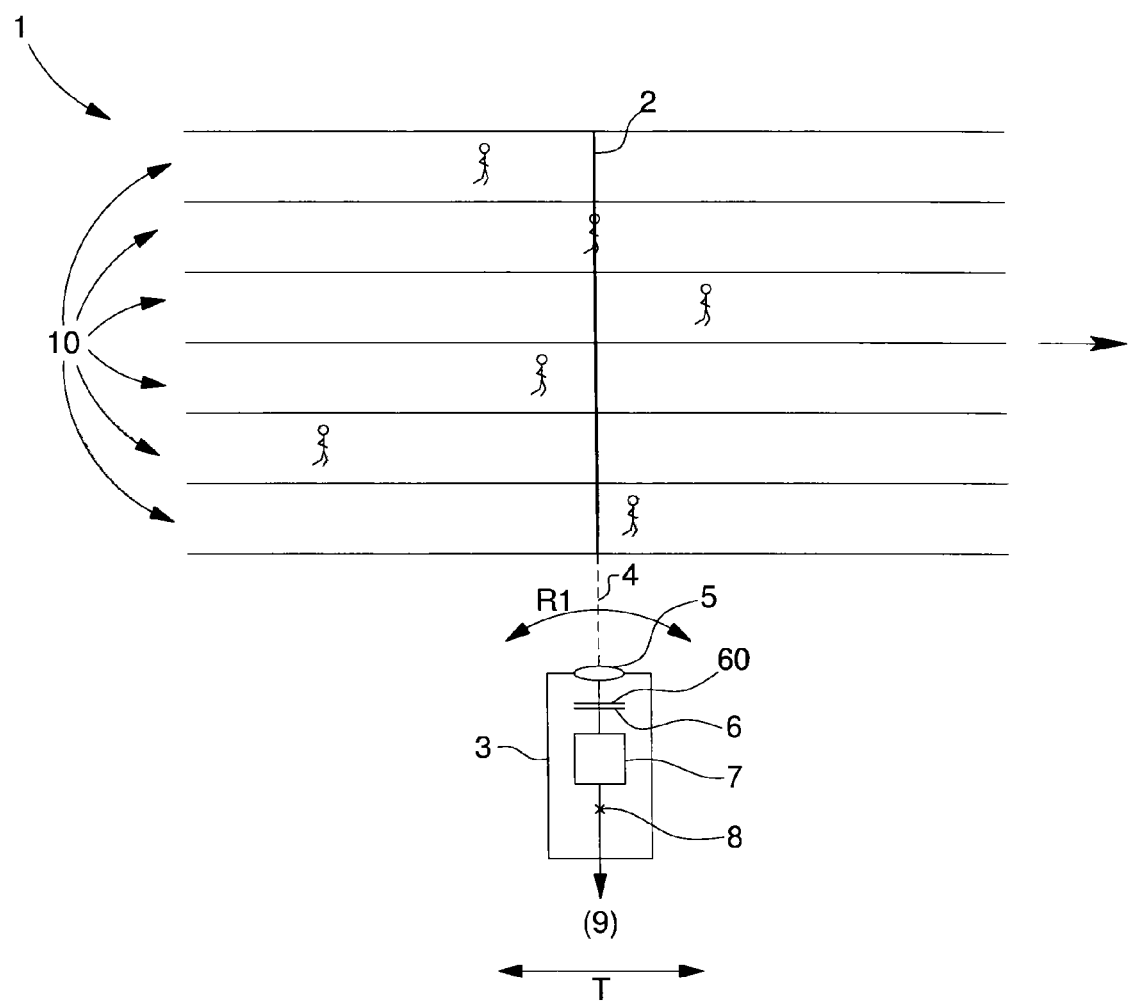
FIG. 1 respectively shows a top view of a photo finish camera used within the scope of the invention, aligned on a finish line.

FIG. 1 shows a block diagram of a photo finish camera used according to this invention. The preferably LS-CDD photo finish camera 3, is aligned on the finish line 2 of a track 1 preferably including several lanes 10 in which different competitors move. It is to be noted that the example of an athletics track 1 is purely indicative and non-limiting, photo finish cameras 3 may also be used in cycling races, car track races, or also for horse races.

Photo finish camera 3 preferably has four degrees of freedom: three in rotation and one in translation. In FIG. 1 only the transverse degree of freedom T and the first rotational degree of freedom R1 about a vertical axis are shown. Nevertheless the camera is preferably rotatably mounted about a ball and socket joint 8 which simultaneously has second and third additional rotational degrees of freedom R2, R3 in order to manage the alignment of the optical axis 4 of camera 3 on finish line 2. Photo finish camera 3 includes a digital sensor 6 formed of a pixel array, as well as an image processing device 7 providing a digital output signal 9 corresponding to the image detected by the sensor. In order to form colour images, photo finish camera 3 also includes a specific colour filter 60 whose optical properties may be adjusted according to various predefined parameters, discussed hereafter. According to a preferred embodiment, this colour filter 60 is affixed directly to the pixels of digital sensor 6, so that the term "pixels" is inaccurately also used for the filter to refer to the different colours covering a pixel of digital sensor 6.

Figure 2:
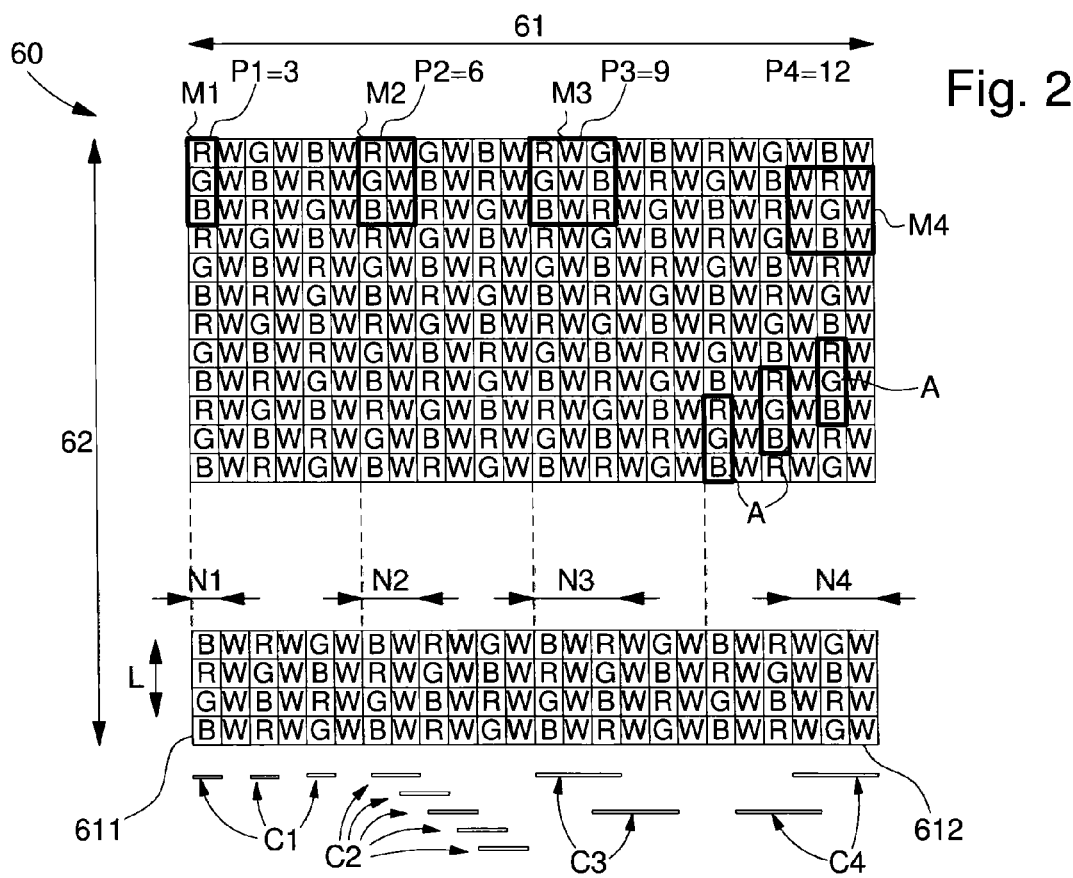
FIG. 2 shows a diagram of a filter according to a preferred embodiment of the invention, and various basic patterns that may be used.

Such a colour filter 60, whose pixel patterns correspond to a preferred embodiment of the invention, is shown in FIG. 2. The width 61 and the total height 62 of the filter are counted in lines and columns of pixels, which are generally between 1024 and 2048 pixels. It is to be noted that filter 60 is formed by alternating the first columns 611 of coloured pixels and second columns 612 of white pixels W, each first column 611 being juxtaposed with a second column 612. This configuration of a colour filter 60 in columns is particularly suitable for a photo finish camera which uses no more than a few columns of pixels aligned on a finish line to provide the most accurate possible time-stamping by associating these columns with a given time, whilst maximising the size of the image, whose height is precisely determined by the number of pixels in the column.

Each of the first pixel columns 611 includes a basic sequence A including at least three different colours, in order to guarantee good colour quality for the image obtained by additive synthesis based solely thereon and without requiring any other pixels from another column. According to the preferred embodiment shown, each first column 611 of coloured pixels thus includes at least one blue pixel B, a green pixel G and a red pixel R. However, by way of alternative, the colours used may also be cyan, magenta and yellow.

In FIG. 2, the basic sequence A is identical for each first column 611, that is to say, the series, from top to bottom, of exactly three pixels: a first red R, a second green G, and a third blue B. This red-green-blue sequence is therefore repeated over the entirety of each of the first colour columns 611. The fact of using only three pixels per sequence makes it possible to improve the colour quality Q, which is modelled, within the scope of the invention, as being inversely proportional to the number of lines of pixels required to obtain the colour image, as explained below in detail with reference to FIG. 3. According to a variant, another sequence could be used corresponding to a modified Bayer pattern wherein the basic sequence repeated over each first column 611 is the series of four pixels instead of three, that is to say: a green G, a blue B, then a further green G and finally a red R. This variant of the basic sequence would be advantageous in terms of sensitivity, since the colour green is not as absorbent as blue or red. Nevertheless, such an improvement would be made to the detriment of colour quality, since four lines of pixels would be required rather than three. Further, the fact of having identical sequences for each basic sequence A of each column makes it possible to limit the number of columns required to create the basic patterns, and thereby to maximise the resolution of the image.

As can be seen in FIG. 2, the arrangement of basic sequences A is not, however, exactly identical for each first column 611 of coloured pixels. Indeed, it is to be noted that each line of pixels has the same sequence of a series of pixels formed by a red R, a green G, then a blue B, as for each first column 611 of coloured pixels, simply with white W pixels inserted. These symmetrical properties are obtained by offsetting the height of each basic sequence A by one pixel from the first column 611 of coloured pixels to the next. In other words, if for a given line of pixels, the pixel in the first column 611 of coloured pixels is of a particular colour, for example red, the pixel of the same colour will be found for example one line higher or lower, in the following first column 611 of coloured pixels and one line lower—or respectively higher—in the preceding first column 611 of coloured pixels. According to the preferred embodiment shown—see to the right of FIG. 2—the basic sequences are offset upwards by one pixel if the columns of coloured pixels are scanned one-by-one from left to right. Consequently only the "modulo 3" first columns 611 of coloured pixels are exactly the same, using an arithmetic formula, i.e. the first, fourth, seventh, tenth, etc. first columns 611 of coloured pixels are identical, as are the second, fifth, eighth, etc. and the third, sixth, ninth, etc. For this reason, dotted lines have been drawn to mark out a fictional line of demarcation exactly replicating the pattern of 6 columns which is effectively repeated over the entire filter 60. The advantageous optical properties of offsetting the basic sequences A have been empirically verified for filters wherein all the lines are of identical colour. Indeed, in addition to the obvious considerations of symmetry of the lines in relation to the columns over the entire colour filter 60, this arrangement facilitates the determination of colour for each pixel by algorithmic calculation.

Using colour filter 60 shown in FIG. 2, it is possible to take black and white photos, for example when brightness is so limited that it is impossible to consider taking a colour photo, by using only the second column 612 of white pixels W centred on the finish line. Filter 60, however, makes it possible to define different patterns to gradually adapt to different speeds of movement, determining the frequency of shots and consequently the exposure time, and more specifically four basic patterns determining different sensitivities, extending over a number of columns comprised between one and three and respectively including 0, 1 or 2 columns of white pixels W.

The four basic patterns M1, M2, M3 and M4 here contain a number of pixels which is a multiple of three, corresponding to the three coloured pixels, respectively red R, blue B and green G, which are used systematically. Thus, each of these patterns extends over a height L of three pixels 3, whilst the width, equal to the number of pixels, is variable; the parametrization of pattern width influences both the resolution and the sensitivity of the sensor. Details of each of the four preferred patterns shown are given below:

- the first basic pattern M1 is formed of exactly three pixels, and corresponds to the basic sequence A of a red pixel R, a green pixel G and a blue pixel B. The first width N1 of the first pattern M1 is therefore equal to one pixel, i.e. the first pattern M1 only extends over a single column;
- the second basic pattern M2 is formed of an array of 2*3=6 pixels containing the same basic sequence A, of a red pixel R, a green pixel G and a blue pixel B, to which is added a series of three white pixels W. The second width N2 of the second pattern M2 is therefore equal to two pixels, i.e. the second pattern M2 extends over two columns, namely a first column 611 of coloured pixels and a second column 612 of white pixels W;
- the third basic pattern M3 is formed of an array of 3*3=9 pixels containing two times three red pixels R, one green pixel G and one blue pixel B over two adjacent first columns 611, and a series of three white pixels W over an inserted second column 612. The third width N3 of the third pattern M3 is therefore equal to three pixels, i.e. the third pattern M3 extends over three columns, namely two first columns 611 of coloured pixels and one second column 612 of white pixels;
- the fourth basic pattern M4 is also formed of an array of 3*3=9 pixels but contains only one basic sequence A of three pixels: one red R, one green G and one blue pixel B in one first column 611 and in this case two series of three white pixels W over two adjacent second columns 612. The fourth width N4 of the fourth pattern M4 is therefore still equal to three pixels.

The optical properties obtained by means of each basic pattern are determined, amongst other factors, by the three following parameters:

Sensitivity S, which is modelled, within the scope of this invention, as corresponding to the average quantity of light per pixel, with a quantity of 20% available per blue pixel B, 30% per red pixel R, 50% per green pixel G and 100% per white pixel W. This parameter is therefore strongly influenced, on the one hand, by the number of white pixels W, and on the other hand, by the respective number of pixels P1, P2, P3, P4 of each pattern M1-M4, by which the overall sensitivity of all the pixels of the filter is divided. The extreme sensitivities are consequently those of the first basic pattern M1 (the least good) and the fourth basic pattern (the best);

Colour quality Q, which is modelled, within the scope of this invention, as being inversely proportional to the number of lines in the pattern required to obtain the calculation of the colour of each pixel by image processing algorithms. For the different basic patterns used, it can be seen that the best colour quality Q is fixed because the height of each basic pattern M1 to M4 is always equal to three pixels, and the resolution N, which is modelled as being equal to the number of columns N of each basic pattern. Thus, the resolution at finish line 2 will improve as the number of respective columns N1-N4 of each basic pattern decreases. Thus, the best resolution will be provided by the first basic pattern M1, but will be least good for the third and fourth basic patterns M3, M4.

To evaluate the global optical performance of each pattern, the scores obtained for each parameter of sensitivity S, of colour quality Q, and of resolution N could preferably be multiplied; however, the choice of pattern may be made while taking account of any weighting, in particular of the parameter of sensitivity S. As the value of parameter Q is preferably set, the best compromise will therefore preferably be sought between the parameters of sensitivity S and of resolution N.

It may be noted that of the four patterns illustrated, at least three basic patterns include a different number of white pixels W, namely 0, 3 or 6 (respectively corresponding to first basic pattern M1, to second and third basic patterns M2-M3, and finally to fourth basic pattern M4). This makes it possible to adjust sensitivity to at least three distinct levels (high-medium-low). Further, the fact that the ratio between the white pixels and coloured pixels may be respectively 0% (for first basic pattern M1), 33% (for third basic pattern M3), 50% (for second basic pattern M2), and 66% (for fourth basic pattern M4) makes it possible to further refine grain size and the range of possible adjustments for this parameter of sensitivity S, thus allowing for adaptation to a large number of types of race and possible weather conditions, typically including clear weather, overcast weather, very cloudy weather and night conditions. Finally, the fact that each of these basic patterns M1-M4 extends over no more than three columns makes it possible to maintain a correct resolution N for the image obtained.

The bottom of FIG. 2 contains references to various sets of columns which may be chosen depending on the basic pattern selected according to race conditions, i.e., in particular, light and the type of race, which affect, amongst other things, the speed at which competitors cross the finish line. A distinction is therefore made between:

- a first set of columns C1 corresponding to a first basic pattern M1 formed of a single column. Only three different equivalent possibilities are shown in FIG. 2 for reasons of legibility, but it is understood that any first column 611 of coloured pixels may be used;
- a second set of columns C2 corresponding to a second basic pattern M2, formed of two columns, that may be chosen from anywhere on the sensor. For reasons of legibility, only five equivalent possibilities have, however, been represented in FIG. 2;
- a third set of columns C3 corresponding to the third basic pattern M3, formed of three columns, including two columns of coloured pixels (i.e. first columns 611) and one column of white pixels W (i.e. a second column 612). Here again, although only two equivalent possibilities have been shown for a sub-set of six columns of colour filter 60, it is understood that this arrangement of two columns of coloured pixels with one inserted column of white pixels can be chosen from anywhere on the array of pixels of colour filter 60.

a fourth set of columns C4 corresponding to the fourth basic pattern M4, also formed of three columns, but this time including two columns of white pixels W (i.e. second columns 612) for only one column of coloured pixels W (i.e. a first column 611). This is, in a way, a complementary set to the third set of columns C3, with the proportions of coloured columns and white columns being inverted. Here again, although only two equivalent possibilities have been shown for a sub-set of six columns of colour filter 60, it is understood that this arrangement of two columns of white pixels W with one inserted column of coloured pixels can be chosen from anywhere on the array of pixels of colour filter 60.

It can therefore be seen, on the one hand, that determining the number of columns N1-N4 corresponding to each basic pattern M1-M4 does not systematically enable automatic selection of the correct set of columns C1-C4 required to be aligned with finish line 2 to offer the desired optical properties. For example, the third and fourth basic patterns M3 and M4 extend over an identical number of three columns (i.e. N3=N4=3) but have different optical properties. In this case, software manipulation may be necessary to achieve offsetting, as explained below with the aid of FIG. 3, which illustrates a sequence of steps for adjusting a photo finish camera 3 according to a preferred embodiment of the invention, and more specifically focussed on the basic filter patterns shown in FIG. 2.

Figure 3:
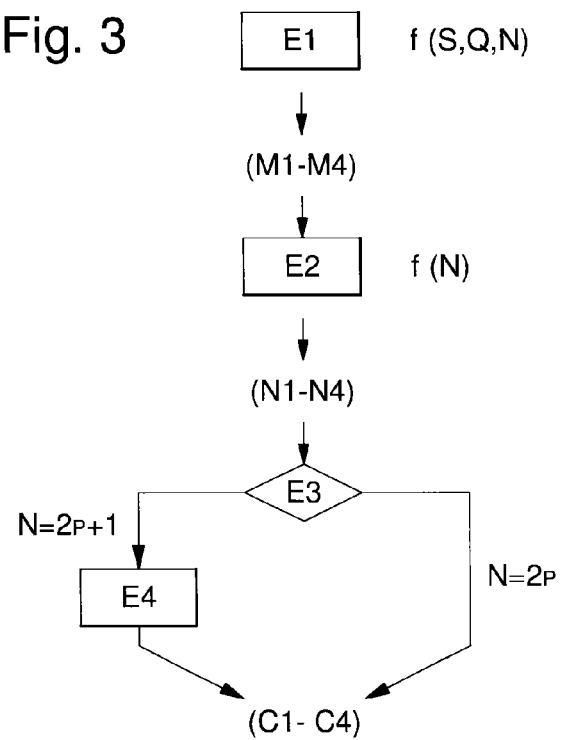
FIG. 3 shows a diagram of the various steps of the method of adjusting a photo finish camera according to a preferred embodiment of this invention.

In the diagram in FIG. 3, the first step E1 consists of choosing a basic pattern having the optical properties of sensitivity S, colour quality Q and resolution N predefined according to race parameters, such as the weather conditions and the type of race (the speed of defilement of the number of lines of pixels per second may vary between 1000 lines per second for athletics to more than 10,000 lines per second for motor racing, the speed for cycling races and horse races being around 3,000 lines per second). According to a preferred embodiment using the colour filter of FIG. 2, the colour quality parameter is set since all the basic patterns have a height L of three pixels.

The second step E2 determines the number of columns N corresponding to the pattern chosen and selects by software the corresponding number of adjacent columns of the array. For the first basic pattern M1 a first number of columns N1 of a single column will therefore be chosen, for the second basic pattern M2 a second number of two adjacent columns N2 will be chosen, and for the third and fourth patterns M3 and M4 three adjacent columns will be chosen (the third and fourth numbers N3 and N4 being equal, both respectively 3).

Then a third step E3 is performed to centre said set of adjacent columns obtained on finish line 2. According to a preferred embodiment, manipulation by software will be preferred, so that no physical movement of photo finish camera 3, which is relatively tedious, will ever be required once it has been installed. Alternatively, the camera may be physically moved using inverse kinematic algorithms to optimise manipulation and minimise the amplitude of movements according to the different degrees of freedom of the three axes of rotation R1, R2, R3 and the transverse degree of freedom T1. In order to facilitate this centering step, regardless of whether or not it is performed by software, an additional reticle may be used, as in the solution proposed in EP Patent No 0898249. When there is an odd number of columns, the central column is aligned on finish line 2; when there is an even number of columns, the operation is slightly more complex, since the reticle theoretically needs to be placed between two adjacent columns. When an additional reticle is used, in practice, the third centering step E3 could be considered to be finished when the reticle is aligned with one of the columns of the selected set of columns.

It will, however, be noted that when the selected pattern has an odd number of columns, centering a set of adjacent columns equal to the pixel width of the pattern does not necessarily guarantee that the correct set of columns, here the third and fourth set of columns C3 and C4 for patterns M3 and M4 respectively, will be chosen. Indeed, when choosing any pixel column from the filter array, the probability of selecting a first column 611 of coloured pixels is the same as that of selecting a second column 612 of white pixels W, and likewise, when choosing a set of three adjacent columns of pixels, it is equally probable that the set of three columns will contain a single column of white pixels W or two columns of white pixels. In this case a fourth step E4, which is subsidiary and used only for an odd number N of columns (i.e. equal to 2P+1, P representing a mathematical model using the divisor of the next lower even number), consists of offsetting the set of adjacent columns aligned on the finish line by a single pixel, i.e. the equivalent of one column, to the left or the right. It is indeed easy to see that if a column of white pixels W (i.e. a second column 612) is aligned on the finish line, it will suffice simply to offset the reticle on the column immediately to the left or right to achieve centering on a first column 611 of coloured pixels where the first basic pattern M1 is found in the third centering step E3 for a first set of columns C1 which comprises only one column. Thus, similarly, the fact of offsetting a set of three adjacent columns by one pixel to the right or left causes a change alternately from the third set of columns C3, corresponding to third pattern M3 with two columns of coloured pixels, to the fourth set of columns C4, corresponding to fourth pattern M4, which contains only one column of coloured pixels for two columns of white pixels W. When the number N of columns is even, however, that is to say equal to 2P, the fourth step is never necessary.

Consequently, by using the adjustment method described in FIG. 3 for a colour filter 60 having the arrangement of first columns 611 of coloured pixels, with basic patterns R, G, B, offset and interlaced with second columns 612 of white pixels W, it can be seen that the manipulations required to adjust the optical properties of the filter according to race conditions are extremely simple. Once the camera has been installed and all the degrees of freedom have been permanently locked, a first pattern can be chosen to determine optical properties which preferably correspond to normal conditions of use, or the statistically most likely conditions. As this pattern extends over one to three columns, it will suffice simply to select at most one or two additional columns, or respectively to remove or deselect at most one or two, and then to offset, where necessary, the set of columns obtained by a width of one pixel if there is an odd number of columns. To further facilitate centering operations, when these are performed using an additional reticle as in the solution proposed in EP Patent No 0898249 by the Applicant, it is possible to choose to systematically select, by default, the column of pixels on which the reticle is aligned and, where necessary, to add the additional columns of pixels in second step E2 prior to software selection for a set of columns whose number is strictly greater than one. The remaining manipulations for centering are then extremely brief and therefore provide maximum responsiveness, which is often essential for events taking place outdoors, which are highly exposed to variations in weather conditions, and in real time, such as, for example, athletics events during world championships or the Olympic Games.

This ease of use applies not only to the initial settings of the photo finish camera, but also to the dynamic adjustment of the optical properties of colour filter 60 by changing the choice of basic pattern The fact of having to add—or respectively remove—no more than two columns at most, according to conditions—and of only having to offset in width at most one column of pixels is all the more appreciable when the events take place at several different times of day, for example, athletics events for which qualification heats are held during the day and finals are often held late in the evening or at night. Thus, for example, if the first basic pattern M1 is selected by default for daytime conditions, it will suffice to add an adjacent second column 612 of white pixels W to obtain the second basic pattern M2, having increased sensitivity, and a further second column 612 of white pixels W in the evening, so that the two second columns 612 of white pixels W are respectively situated on either side of the first column 611 of coloured pixels aligned on finish line 2, to obtain the fourth basic pattern M4, whose sensitivity is even better, after nightfall. To adjust the colour filter to intermediate sensitivity, if required, it is possible to change from first basic pattern M1 to third basic pattern M3, by adding two adjacent columns, respectively a second column 612 of white pixels W and a first column 611 of coloured pixels on the same side, and to then offset the set by one pixel. All of these simple software selection operations of adding and/or potentially de-selecting columns of pixels can therefore make it possible to follow the entire progress of an event while gradually adjusting the optical properties of the optical filter installed in photo finish camera 3.

It will however be understood that the basic patterns M1-M4 and the basic sequence A have been given merely by way of example to illustrate a particularly preferred embodiment. However, other basic patterns extending over a larger number of columns, or including a basic sequence A extending over a larger number of pixels, or including other colours may also be envisaged without departing from the scope of the invention, given that the software manipulations for centering and offsetting remain relatively simple. By way of example, it could be envisaged, in particular, to use alternating R, G, B and cyan, magenta and yellow basic sequences on two successive columns.

Also, without departing from the scope of this invention, the method for the adjustment of the photo finish camera described above may also choose not to use any part of the sub-set of patterns from the set of patterns M1-M4 above, according to the conditions of use, which for example only require the use of two or three of the four patterns.

What is claimed is:

1. A color filter for a digital sensor, said color filter comprising:
    a two-dimensional pixel array, each pixel corresponding to a given color, said pixel array being formed by alternating first columns of colored pixels and second columns of white pixels, wherein each first column of colored pixels includes a basic sequence of pixels repeated over an entirety of the first column of colored pixels, said basic sequence of pixels including at least three pixels of three different colors,
    wherein the pixel array includes identical ones of the first columns that include a same entire sequence of the colored pixels, and at least three of the second columns of white pixels are interposed between two of the identical ones of the first columns that are closest to one another.

2. The color filter according to claim 1, wherein said basic sequence is identical for each first column.

3. The color filter according to claim 2, wherein said basic sequence includes at least one blue pixel, one green pixel and one red pixel.

4. The color filter according to claim 3, wherein said basic sequence includes exactly three pixels.

5. The color filter according to the claim 4, wherein each said basic sequence of a first said column of colored pixels is offset in height by one pixel relative to each of said basic sequences of said adjacent first columns of colored pixels.

6. A photo finish camera including the color filter according to claim 1 and a digital array sensor, said photo finish camera being mounted to rotate about a ball and socket joint possessing three degrees of freedom in rotation and also possessing one degree of freedom in translation in a direction of a race.

7. A method of adjusting the photo finish camera according to claim 6, wherein the method comprises:
    selecting a basic pattern having optical properties of sensitivity, of color quality and of resolution which are predefined according to race parameters;
    software selection of a set of adjacent columns whose number corresponds to a width of said selected basic pattern; and
    centering said set of adjacent columns on a finish line.

8. The method of adjustment according to claim 7 for the photo finish camera, said selecting the basic pattern allowing at least two different basic patterns of different sensitivities to be chosen.

9. The method of adjustment according to claim 8 for the photo finish camera, said selecting the basic pattern allowing at least four basic patterns of different sensitivities to be chosen, extending over a number of columns comprised between one and three.

10. The method of adjusting the photo finish camera according to claim 9, wherein said centering is followed by a subsidiary fine adjustment, including offsetting a width of said set of adjacent columns by an integer number of columns of pixels, wherein said fine adjustment is only employed when said number of columns corresponding to the width of said basic pattern determined in said software selection is an odd number strictly greater than 1.

11. The method of adjusting the photo finish camera according to claim 10, wherein said fine adjustment requires the width of said set of columns of pixels to be offset by only one column of pixels, in any direction.

12. The method of adjusting the photo finish camera according to claim 11, wherein said centering and, wherever necessary, said fine adjustment, consist only of software adjustment.

13. The method of adjusting the photo finish camera according to claim 12, wherein a change from one set of predefined columns, corresponding to a predefined basic pattern, to another predefined set of columns, requires simply adding or removing no more than two columns of pixels, and offsetting a width of only one column of pixels.

* * * * *